United States Patent
Steinhagen

(10) Patent No.: US 11,554,726 B2
(45) Date of Patent: Jan. 17, 2023

(54) MACHINE WITH SENSOR UNITS RETAINED BY BREAKAWAY COUPLERS

(71) Applicant: Caterpillar Paving Products Inc., Brooklyn Park, MN (US)

(72) Inventor: Anthony Paul Steinhagen, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 497 days.

(21) Appl. No.: 16/815,192

(22) Filed: Mar. 11, 2020

(65) Prior Publication Data

US 2021/0284075 A1  Sep. 16, 2021

(51) Int. Cl.
| | |
|---|---|
| B60R 11/00 | (2006.01) |
| E01C 19/48 | (2006.01) |
| F16M 13/02 | (2006.01) |
| E01C 23/01 | (2006.01) |
| F16B 2/10 | (2006.01) |
| F16B 1/00 | (2006.01) |
| E01C 19/00 | (2006.01) |
| E01C 23/07 | (2006.01) |
| F16B 2/06 | (2006.01) |
| F16B 21/06 | (2006.01) |

(52) U.S. Cl.
CPC .............. B60R 11/00 (2013.01); E01C 19/48 (2013.01); E01C 19/4873 (2013.01); E01C 23/01 (2013.01); F16B 1/00 (2013.01); F16B 2/10 (2013.01); F16M 13/02 (2013.01); B60R 2011/004 (2013.01); B60R 2011/0049 (2013.01); E01C 19/008 (2013.01); E01C 23/07 (2013.01); F16B 2/065 (2013.01); F16B 21/06 (2013.01); F16B 2001/0035 (2013.01)

(58) Field of Classification Search
CPC combination set(s) only.
See application file for complete search history.

(56) References Cited

U.S. PATENT DOCUMENTS

| | | | |
|---|---|---|---|
| 5,114,267 A | * | 5/1992 | Smith ...................... E01C 19/48 404/91 |
| 5,450,009 A | | 9/1995 | Murakami |
| 10,499,631 B2 | * | 12/2019 | Light ....................... E05D 7/00 |

(Continued)

FOREIGN PATENT DOCUMENTS

| | | |
|---|---|---|
| CN | 207185204 U | 4/2018 |
| JP | 3126710 B2 | 5/2001 |
| JP | 3238730 B2 | 12/2001 |

*Primary Examiner* — Monica E Millner

(57) ABSTRACT

A paving machine includes an implement, an elongated structure, a sensor arrangement, and one or more breakaway couplers. The implement modifies a surface during a movement of the paving machine. The elongated structure is coupled to a side portion of the paving machine and extends along a direction of the movement. The sensor arrangement includes sensor units arranged sequentially along the elongated structure. The breakaway couplers correspondingly normally retain the sensor units to the elongated structure. Each breakaway coupler includes a mounting structure and a retainer unit. The mounting structure is secured to one of the elongated structure or a corresponding sensor unit, while the retainer unit retains the other of the elongated structure or the corresponding sensor unit to the mounting structure by a retention force, which is adjustable.

20 Claims, 4 Drawing Sheets

(56) References Cited

U.S. PATENT DOCUMENTS

| | | | |
|---|---|---|---|
| 10,933,820 B1* | 3/2021 | Budraitis | B60R 13/105 |
| 2009/0245937 A1* | 10/2009 | Speers | E01C 19/48 |
| | | | 404/101 |
| 2010/0014916 A1* | 1/2010 | Green | E01C 19/006 |
| | | | 404/84.1 |
| 2014/0165693 A1* | 6/2014 | Buschmann | B60W 30/12 |
| | | | 73/1.79 |
| 2015/0003914 A1* | 1/2015 | Steinhagen | G01K 1/14 |
| | | | 404/118 |
| 2016/0069671 A1* | 3/2016 | Dokter | G01C 3/00 |
| | | | 356/138 |
| 2017/0182954 A1 | 6/2017 | Fais et al. | |
| 2018/0368387 A1* | 12/2018 | Welte | A01C 23/047 |
| 2019/0382967 A1* | 12/2019 | Kleinvachter | E01C 23/01 |
| 2020/0048843 A1* | 2/2020 | Kelly | E01C 19/48 |
| 2020/0060076 A1* | 2/2020 | Welte | A01M 7/0078 |

* cited by examiner

MACHINE WITH SENSOR UNITS RETAINED BY BREAKAWAY COUPLERS

TECHNICAL FIELD

The present disclosure relates to a sensor arrangement for a paving machine, and, more particularly, to a break-away coupler for retaining the sensor arrangement to a structure on the paving machine.

BACKGROUND

A machine, such as a paving machine or a cold planer, generally includes an implement that is applied to modify a surface (e.g., an unpaved surface) as the machine moves over the surface. To properly alter and modify the surface, the implement may be positioned appropriately with respect to the surface. In this regard, the machine may include a number of sensor units (e.g., ultrasonic sensor units) arranged sequentially along one or more of the sides of the machine. The sensor units detect a parameter associated with the surface based on which data related to the surface (e.g., a grade or a slope of the surface) may be determined. Based on said data, the implement may be adjusted with respect to the surface.

Often, such sensor units are coupled to an elongated structure (generally referred to as an averaging beam) arranged along a side of the machine, and which extends generally along a direction of machine motion. During an operation of the machine, a likelihood for such sensor units to interfere with a terrain (e.g., walls, curbs, barriers, structures, etc.) surrounding the machine, or with the surface itself, is relatively high. In several instances, such interferences wreck and/or irreparably damage the sensor units, leading to one or more of a machine breakdown, operational downtime, service effort, and incurrence of costs.

US Publication No. 20170182954 relates to an attachment device, such as a camera or a sensor, which is mounted to a road paver machine. The attachment device monitors the process involving the receipt of a paving material and its distribution on the ground. The attachment device is mounted by means of a magnetic quick mounting unit.

SUMMARY OF THE INVENTION

In one aspect, the disclosure is directed towards a paving machine. The paving machine includes an implement, an elongated structure, a sensor arrangement, and one or more breakaway couplers. The implement modifies a surface during a movement of the paving machine. The elongated structure is coupled outwardly to a side portion of the paving machine and extends along a direction of the movement. The sensor arrangement includes one or more sensor units arranged sequentially along the elongated structure, while the breakaway couplers correspondingly normally retain the sensor units to the elongated structure. Each breakaway coupler includes a mounting structure and a retainer unit. The mounting structure is secured to one of the elongated structure or a corresponding sensor unit of the sensor units, while the retainer unit retains the other of the elongated structure or the corresponding sensor unit to the mounting structure by a retention force. The retention force is adjustable to cause the mounting structure to be disengaged with respect to one of the elongated structure or the corresponding sensor unit and allow the corresponding sensor unit to be dislodged from the elongated structure to inhibit damage to the sensor unit, in an event the sensor unit collides against an obstacle.

In another aspect, the disclosure is related to a method for retaining one or more sensor units to a paving machine. The method includes coupling an elongated structure outwardly to a side portion of the paving machine such that the elongated structure extends along a direction of movement of the paving machine. Further, the method includes providing one or more breakaway couplers to correspondingly normally retain the one or more sensor units to the elongated structure such that the sensor units are arranged sequentially along the elongated structure. Providing each break-away coupler of the one or more breakaway couplers includes securing a mounting structure to one of the elongated structure or a corresponding sensor unit of the one or more sensor units; providing a retainer unit to retain the other of the elongated structure or the corresponding sensor unit to the mounting structure by a retention force; and adjusting the retention force to cause a disengagement of the mounting structure with respect to one of the elongated structure or the corresponding sensor unit and allow the corresponding sensor unit to be dislodged from the elongated structure to inhibit damage to the corresponding sensor unit, in an event the corresponding sensor unit collides against an obstacle.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
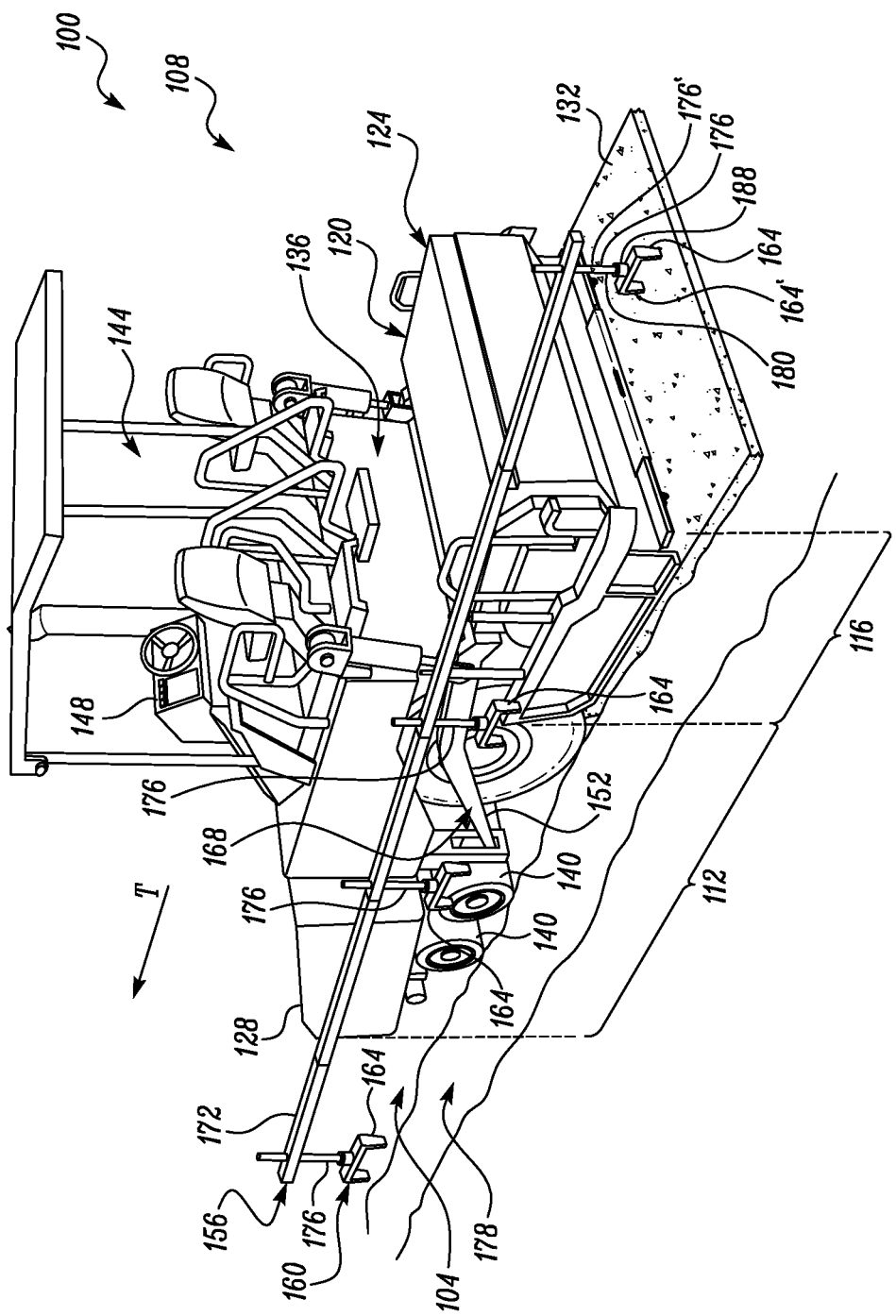
FIG. 1 is a paving machine with a sensor arrangement having one or more sensor units arranged sequentially along an elongated structure of the paving machine, in accordance with an aspect of the present disclosure.

Referring to FIG. 1, a machine 100 is illustrated. The machine 100 may be configured to perform operations over a surface 104 (e.g., an unpaved surface) to modify the surface 104 (e.g., during a movement over the surface 104). In one embodiment, the machine 100 may perform a paving operation and thus embody a paving machine 108, as shown. It will be appreciated that various aspects of the present disclosure are discussed with respect to the paving machine 108. Nevertheless, one or more of said aspects may be suitably applied to other machines, as well. For example, one or more aspects of the present disclosure may also be applicable to a cold planar.

The paving machine 108 may include a tractor portion 112 and an implement portion 116. The implement portion 116 may include an implement 120 such as a screed 124, as shown. The tractor portion 112 may include a hopper 128 and may tow the screed 124 along an exemplary operational direction (see direction, T). A conveying system having belts, chains, and/or augers (not shown) may be provided to transport material (e.g., a paving material, such as a hot asphalt mixture) from the hopper 128 to the screed 124. The screed 124 may receive the material and may grade, level, and shape the material, into a layer having a desired thickness and width over the surface 104 such that a mat 132 is formed over the surface 104. In the disclosed example, the paving machine 108 may be self-powered by way of a power source (e.g., an internal combustion engine) (not shown) supported on the tractor portion 112. It is contemplated, however, that, in some cases, the tractor portion 112 may be omitted from the paving machine 108, and the hopper 128 and/or the screed 124 may be towed by another machine (e.g., a dump truck) (not shown).

The tractor portion 112 may include, among other components and systems, a machine frame 136, a number of traction devices 140 (e.g., in the form of tracks and/or wheels) to support and propel the machine frame 136 (and thus the paving machine 108) over the surface 104, as the traction devices 140 may receive power from the power source. Further, the tractor portion 112 may include an operator station 144 supported over the machine frame 136, as shown. The operator station 144 may facilitate stationing of one of more operators therein, enabling operator control over one or more functions of the paving machine 108, e.g., by access to one or more operator interfaces 148 housed within the operator station 144.

The machine frame 136 may also support the hopper 128 and tow arms—only one tow arm (i.e., tow arm 152) is viewable in FIG. 1. The tow arms may transmit tractive forces to the screed 124, e.g., during a movement of the paving machine 108, such that the screed 124 may be towed and moved along with a movement of the machine frame 136 along direction, T One or more actuators may be connected between machine frame 136 and the tow arms, and said actuators may be controlled (e.g., via controls provided in the operator station 144) to raise, lower, shift, and/or tilt the screed 124, relative to the machine frame 136 so as to adjust the screed 124 relative to the surface 104.

During an exemplary paving operation, if asphalt were applied as the paving material, a hot asphalt mixture may be transferred from the hopper 128, spread, and then forced under the screed 124 by way of the conveying system. The screed 124 may shape, level, and may provide pre-compaction to the inflowing asphalt mixture, e.g., by way of a vibratory action. In that manner, a quantity of the asphalt mixture is paved by the screed 124, so as to form the mat 132, as the screed 124 is towed by the tractor portion 112 along the direction, T In so doing, the screed 124 modifies the surface 104 during a movement of the paving machine 108 over the surface 104—such modification of the surface 104 may be termed as a paving operation.

The paving machine 108 may include an elongated structure 156 (generally referred to as an averaging beam structure) and a sensor arrangement 160 having one or more sensor units 164. As shown in FIG. 1, the elongated structure 156 may be coupled outwardly to one of the side portions (e.g., to a left side portion 168) of the paving machine 108, and may extend in the direction (e.g., direction, T) of the exemplary movement of the paving machine 108. An elongated structure, similar to the elongated structure 156, may be provided on a right side portion of the paving machine 108, as well. In one or more instances, such elongated structures and the corresponding sensor arrangements may form part of a larger system of the paving machine 108 that facilitates an adjustment of the screed 124 relative to the surface 104. The elongated structure 156 may include a beam 172 and a number of posts 176. The terms 'left' and 'right', as used in the present disclosure, are in relation to the exemplary direction of travel of the paving machine 108, as represented by arrow, T, in FIG. 1, i.e., the terms 'left' and 'right' may be relative and be understood by someone whose line of sight is aligned along direction, T.

With regard to the beam 172, the beam 172 may be longitudinally extended so as to impart an elongated characteristic profile to the elongated structure 156. In one example, the beam 172 may be supported on the machine frame 136 and/or on the tow arm 152, in a manner which is customary and known to those with ordinary skill in the art, such that the beam 172 may be extended in the direction of movement of the paving machine 108. The beam 172 may be formed by coupling multiple smaller beam segments together, and, further, the beam 172 may define a rectangular cross-section throughout its length, although various other cross-sections, such as a circular cross-section or an elliptical cross-section of the beam 172, may be contemplated.

With regard to the posts 176, the posts 176 may be coupled to the beam 172 at regular (or irregular) intervals and may be disposed in a spaced relationship, as shown. Although the posts 176 are exemplarily four in number, a lesser or a higher number of posts 176 may be contemplated. With reference to one of the posts 176 (e.g., a post 176') among the many posts 176, for example, the post 176' may be directly (e.g., threadably) coupled to the beam 172 and/or may be slid through a portion of the beam 172 and may be retained to the beam 172 in a press-fit manner. In some cases, the post 176' may be coupled to the beam 172 by a connector (not shown), and one or more of threaded fasteners may engage such connectors with the beam 172 so as to retain the post 176' to the beam 172. The post 176' may be varied along a length of the beam 172, from one position to another position on the beam 172. Further, the post 176' itself may be raised or lowered with respect to the beam 172. In some other cases, the post 176' and the beam 172 may be integrally formed.

It may be noted that several such methods of coupling (or integrating) the post 176' to the beam 172 may be contemplated, and it is provided that such methods are generally customarily and widely applied, any of which, either exclusively or in combination with the other, may be suitably applied for coupling the post 176' to the beam 172. Discussions with regard to the post 176' may be suitably applied to all the posts 176. Further, given the myriad of methods available for coupling the post 176' to the beam 172, no further discussion related to the coupling of the post 176' (or any of the posts 176) to the beam 172 shall be included in the present disclosure.

Although not limited, the post 176' may be disposed generally orthogonally with respect to the beam 172 and may define an end 180 that may be directed downwards to face the surface 104. The term 'generally orthogonally' means that, in some cases, the post 176' may include an inclination (e.g., a minimal inclination) with respect to the beam 172. Such an inclination may be required to accommodate and account for one or more operational constraints, such as a lack of space, encountered during a paving operation.

The sensor arrangement 160 may include one or more sensor units 164, as noted above. The sensor units 164 (e.g., sensor unit 164') may be correspondingly coupled to the ends (e.g., end 180) of the posts 176 (e.g., post 176'). In that manner, the sensor units 164 may be arranged sequentially along the elongated structure 156. In one application, the sensor units 164 may be configured to detect a parameter associated with the surface 104 to facilitate an adjustment of the screed 124 with respect to the surface 104. To this end, the sensor units 164 may be configured to detect a parameter, such as a height of the corresponding sensor units 164 with respect to the surface 104 (e.g., with respect to a portion 178 of the surface 104 that is disposed besides or adjacent to the traction devices 140 of the paving machine 108). The portion 178 of the surface 104 may be used as a reference surface by a control system (e.g., the paving machine's Electronic Control Module) (not shown) to determine data (e.g., a grade or a slope) of the surface 104. Based on the determination of such data, the control system may adjust the screed 124 with respect to the surface 104.

As an example, the sensor units 164 may include one or more ultrasonic sensors each transmitting ultrasonic pulses (e.g., in the form of radiation cones). During operation, radiation cones from the sensor units 164 may impinge downwards onto the reference surface (i.e., onto the portion 178 of the surface 104) disposed besides the traction devices 140. Based on an elapsed time between an activation of the ultrasonic sensors and the reception of an ultrasonic pulse, the sensor units 164 may detect the parameter as corresponding heights or corresponding distances between the sensor units 164 and the corresponding points on the reference surface from which the ultrasonic pulses reflect and return to the corresponding sensor units 164. The control system may in turn determine data (e.g., a grade or a slope) based on the corresponding heights, and may accordingly adjust the implement (i.e., the screed 124) relative to the surface 104.

Although the aforesaid method of adjusting the screed 124 is discussed by way of ultrasonic sensors, a variety of other methods of adjusting the screed 124 by use of different types of sensors may be contemplated. Accordingly, the aforesaid method of adjusting the screed 124 by way of ultrasonic sensors need to be seen as exemplary. Further, it may be noted that the disclosure further below includes description largely directed to the post 176' and the sensor unit 164', and the manner of coupling of the post 176' to the sensor unit 164'. Such discussion may suitably be applicable to all sensor units 164 vis-à-vis the corresponding posts 176, and the manner of coupling between them.

According to one or more aspects of the present disclosure, the paving machine 108 includes a breakaway coupler 188 coupled between the sensor unit 164' and the post 176'. For example, the breakaway coupler 188 normally retains the sensor unit 164' to the elongated structure 156 (or to the end 180 of the post 176' of the elongated structure 156).

Figure 2:
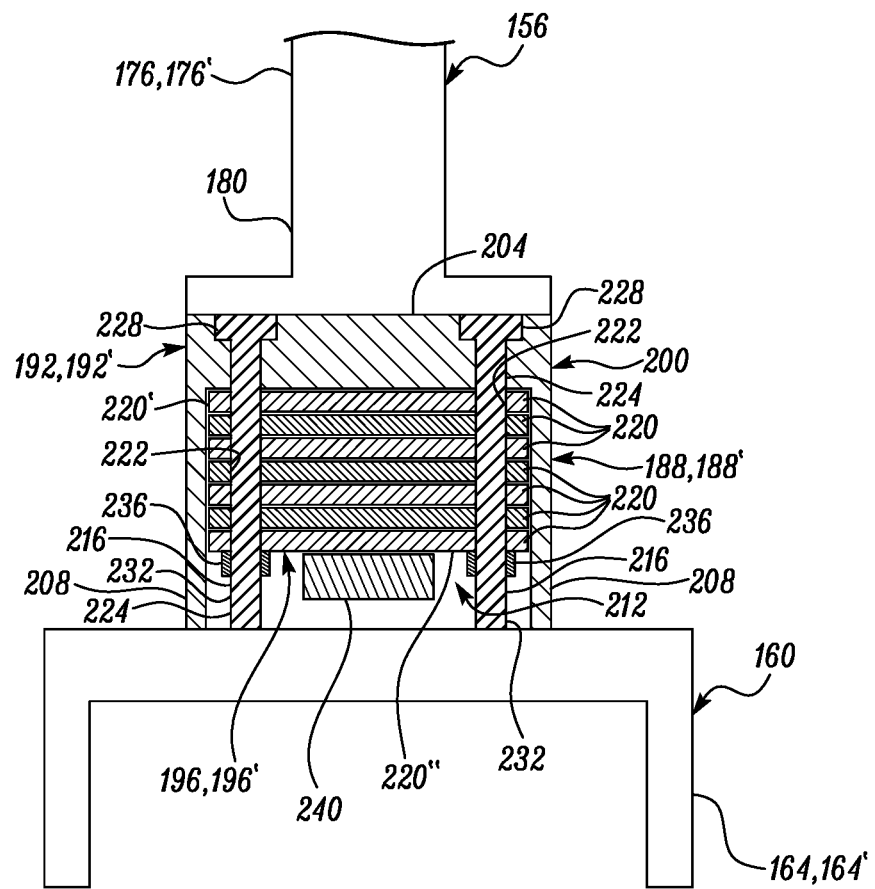
FIGS. 2 to 4 illustrate various embodiments related to a breakaway coupler that retains the sensor arrangement to the elongated structure, in accordance with an aspect of the present disclosure.
Figure 3:
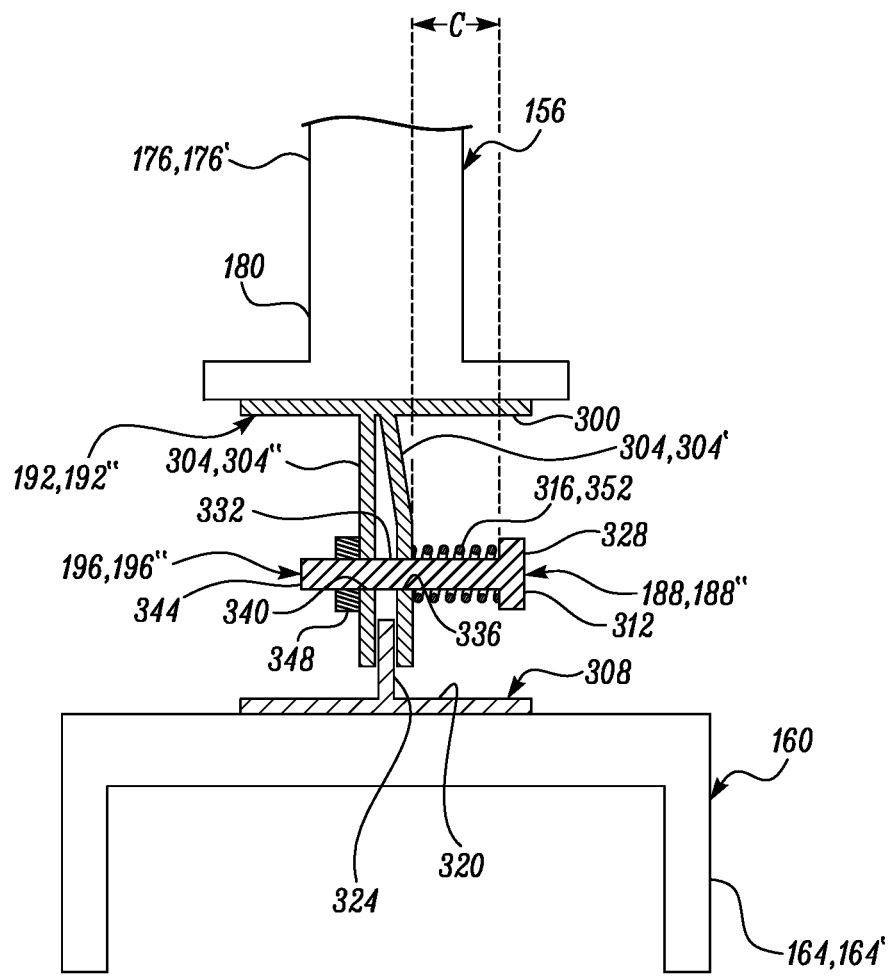
Figure 4:
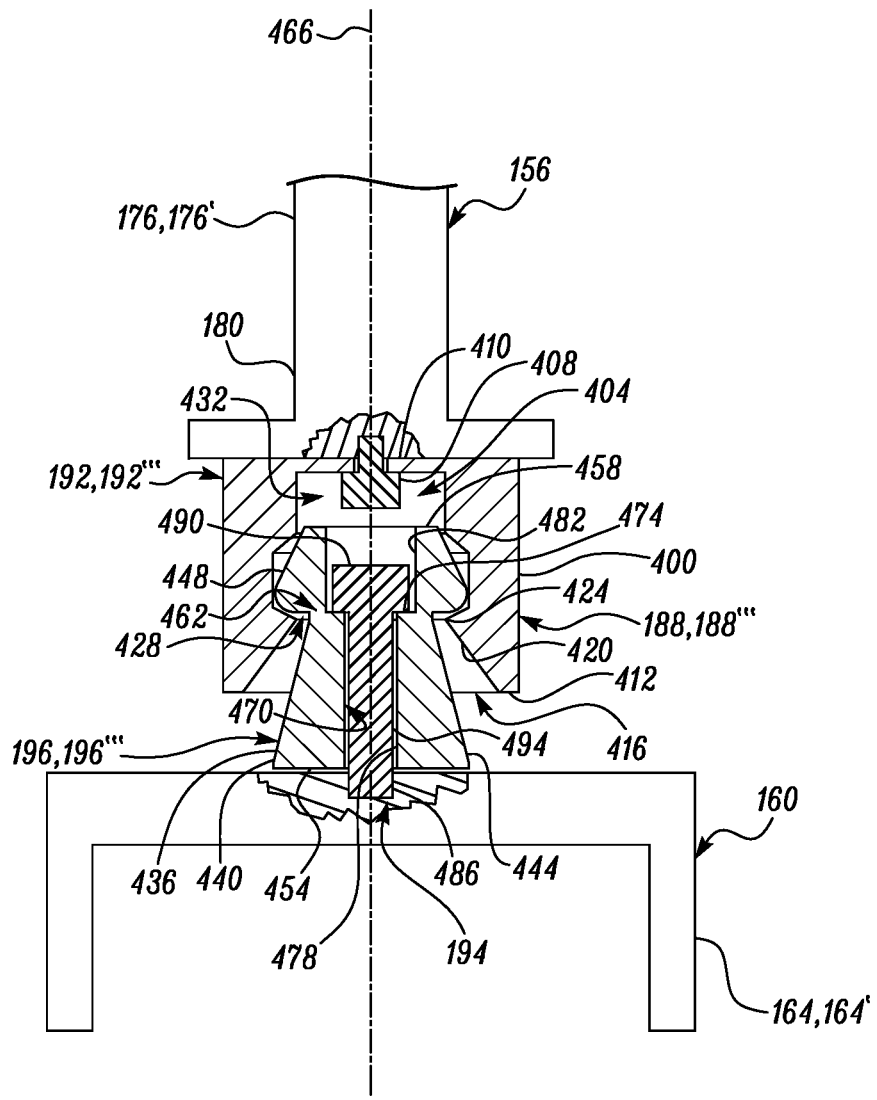

Referring to FIGS. 2, 3, and 4, the breakaway coupler 188 includes a mounting structure 192 and a retainer unit 196. The mounting structure 192 may be secured to one of the end 180 or the sensor unit 164', while the retainer unit 196 retains the other of the end 180 or the sensor unit 164' to the mounting structure 192 by a retention force. According to the disclosed embodiment, the mounting structure 192 is mounted to the end 180, while the retainer unit 196 retains the sensor unit 164' to the mounting structure 192 (and thus to the end 180) by the retention force. In one or more cases, the retention force is adjustable to cause the mounting structure 192 to be disengaged with respect to the sensor unit 164' and allow the sensor unit 164' to be dislodged from the end 180 in an event the sensor unit 164' were to collide against an obstacle to inhibit damage to the sensor unit 164'.

The phrase 'normally retains', as used above, is applied to various states of the paving machine 108, such as a state in which the paving machine 108 is executing the paving operation, a state in which the paving machine 108 is idle, a state in which the paving machine 108 is being serviced, etc. In each such state, the retainer unit 196 may positively retain the sensor unit 164' to the mounting structure 192 (or to the elongated structure 156). However, the phrase 'normally retains' may not apply for states of the paving machine 108 or for events associated with the paving machine 108 in which the sensor unit 164' may collide against an obstacle. This is because, during such events, the breakaway coupler 188 permits the mounting structure 192 to be disengaged with respect to the sensor unit 164' to allow the sensor unit 164' to be dislodged from the end 180 so as to inhibit damage to the sensor unit 164'. Detailed discussions related to the breakaway coupler 188 and the manner in which the breakaway coupler 188 permits such disengagement shall now follow.

It may be noted that FIGS. 2, 3, and 4, illustrate various embodiments of the breakaway coupler 188. For example, FIG. 2 relates to a breakaway coupler 188', FIG. 3 relates to a breakaway coupler 188", and FIG. 4 relates to a breakaway coupler 188'''. Discussions in the forthcoming disclosure includes details related to each of the breakaway coupler 188', the breakaway coupler 188", and the breakaway coupler 188''', and their arrangements with respect to the elongated structure 156 (i.e., to the end 180 of post 176' of the elongated structure 156) and the sensor unit 164'. It may be noted that mounting structures 192 correspondingly associated the breakaway couplers 188', 188", 188''', may be respectively referred to as mounting structures 192', 192", 192''', while retainer units 196 correspondingly associated with the breakaway couplers 188', 188", 188''', may be respectively referred to as retainer units 196', 196", 196'''.

With regard to the breakaway coupler 188' illustrated in FIG. 2, the breakaway coupler 188' includes the mounting structure 192' and the retainer unit 196'. The mounting structure 192' of the breakaway coupler 188' includes a bracket 200. The bracket 200 may include a base wall 204, and two sidewalls 208 extending (e.g., uprightly) from the base wall 204. The two sidewalls 208 may be coupled to the base wall 204 by means, such as welding, although it is possible for the base wall 204 and the two sidewalls 208 to be formed integrally. The two sidewalls 208 may be spaced apart from each other, imparting a U-shaped configuration to the bracket 200. Together, the base wall 204 and the two sidewalls 208 may define a cavity 212 of the bracket 200. The base wall 204 may be coupled to the end 180 of the post 176' by adhesives (e.g., industrial grade adhesives). Additionally, or optionally, one or more fasteners (e.g., threaded fasteners) may be passed through the base wall 204 and further into the end 180 so as to retain the bracket 200 to the end 180. The bracket 200 may be formed from a metallic material, although other materials are contemplated.

The retainer unit 196' of the breakaway coupler 188' includes one or more shims 220 that are received and positioned into the cavity 212 of the bracket 200. The shims 220 may be made from a metallic material, although other materials, such as plastics, may be used for forming the shims 220. For example, the shims 220 are positioned one over the other serially (e.g., resembling a layered stack), thereby defining an innermost shim 220' and an outermost shim 220" with respect to the cavity 212.

According to one aspect of the present disclosure, the retainer unit 196' may include a pair of shim retainers 216 (e.g., bolts 224 having head segments 228 and shank segments 232) may be used to retain the shims 220 within the cavity 212 against the base wall 204, as shown. For example, the pair of shim retainers 216 (e.g., the bolts 224) may pass through the base wall 204 and the shims 220. In one application, head segments 228 of the bolts 224 may be seated within the base wall 204 while the shank segments 232 of the bolts 224 may be passed through the shims 220, extend beyond the outermost shim 220", and be retained thereof by having respective nuts 236 engaged to the corresponding shank segments 232 of the bolts 224. In this regard, the shims 220 may define slots 222 (only two slots 222 are annotated) to allow passage to the shank segments 232 of the bolts 224 therethrough. The nuts 236 may also be made to rest atop the outermost shim 220", such that the shims 220 are gripped together and relatively tightly retained within the cavity 212 as a single assembly.

Further, the retainer unit 196' of the breakaway coupler 188' includes a magnetic adaptor 240. The magnetic adaptor 240 may be coupled to the outermost shim 220", for example, by use of one or more of adhesives (such as industrial grade adhesives). In one or more embodiments, threaded fasteners, luer-lock fittings, magnetic couplings, snap fittings, etc., may also be applied to couple the magnetic adaptor 240 to the outermost shim 220". The magnetic adaptor 240 may attract and retain the sensor unit 164' by magnetic force (e.g., in the case where an outer body of the sensor unit 164' is made from a metallic material). In this regard, the magnetic adaptor 240 may induce a magnetic force to attract and retain the sensor unit 164' to the mounting structure 192' (or the bracket 200). It may be noted that more the number of shims 220, closer the magnetic adaptor 240 may be positioned with respect to the sensor unit 164', and, thus, greater may be the retention force between the magnetic adaptor 240 and the sensor unit 164', and in turn between the end 180 of the post 176' and the sensor unit 164'. In one or more embodiments, an arrangement of the shims 220 with respect to the magnetic adaptor 240 may be such that the magnetic adaptor 240 is positioned at least partially or wholly within the cavity 212.

With regard to the breakaway coupler 188" illustrated in FIG. 3, the breakaway coupler 188" includes the mounting structure 192" and the retainer unit 196". The mounting structure 192" includes a base plate 300 and a pair of arms 304, defining a first arm 304' and a second arm 304", extending from the base plate 300. In some embodiments, portions associated with one or both of the first arm 304' and the second arm 304" may be inclined towards the other of the first arm 304' and the second arm 304". In so doing, spring tension may act between the first arm 304' and the second arm 304" causing the pair of arms 304 to be biased towards each other, thus requiring application of an external pressure if it were required for the first arm 304' to move away from the second arm 304" and enlarge a gap that may be defined between the first arm 304' and the second arm 304".

The retainer unit 196" of the breakaway coupler 188" includes a fixture 308, a fastener 312, and a biasing member 316. The fixture 308 is coupled to the sensor unit 164". For example, the fixture 308 may include a floor plate 320 and a stem plate 324 protruding (e.g., uprightly) from the floor plate 320. The floor plate 320 and the stem plate 324 may be coupled to each other using connection means that may be similar to the connection means already discussed with regard to the coupling of the base wall 204 to the two sidewalls 208 (associated with the breakaway coupler 188'). Further, the floor plate 320 itself may be coupled to the sensor unit 164' in a manner similar to what has been described with regard to the coupling of the base wall 204 to the end 180.

The fastener 312 includes a head portion 328 and a shank portion 332. The shank portion 332 may be in passage through the first arm 304' and is fastened (e.g., threadably) to the second arm 304". In one example, the first arm 304' may define an aperture 336 through which the shank portion 332 of the fastener 312 may freely pass through. The second arm 304" may include an opening 340 that may receive the shank portion 332 and may allow the shank portion 332 to be threadably engaged thereto, such that the shank portion 332 may be fastened with respect to the second arm 304". In one example, the shank portion 332 may define an end 344 that may pass through the opening 340 of the second arm 304" and a nut 348 may be provided (e.g., as part of the retainer unit 196") to retain the end 344 of the shank portion 332 to the second arm 304". It may be noted that the arrangement of the fastener 312 with respect to the first arm 304' and the second arm 304" may be such that a clearance, C, is defined between the head portion 328 and the first arm 304'.

The biasing member 316 may be positioned in the clearance, C, defined between the head portion 328 and the first arm 304'. More particularly, the biasing member 316 may include a spring 352 (e.g., a helical spring) that may be disposed around a section of the shank portion 332 of the fastener 312 disposed and acquiring a position at the clearance, C. In that manner, the biasing member 316 is positioned in between the head portion 328 and the first arm 304' and exerts a biasing force between the first arm 304' and the head portion 328 so as to bias the first arm 304' away from the head portion 328 towards the second arm 304". In so doing, the biasing member 316 enables and causes the fixture 308 (i.e., the stem plate 324 of the fixture 308) to be clinched between the first arm 304' and the second arm 304".

Effectively, the stem plate 324 of the fixture 308 may be received between the first arm 304' and the second arm 304". Given the biasing force provided by the biasing member 316 (and, optionally, the spring tension acting between the first arm 304' and the second arm 304") the stem plate 324 of the fixture 308 may be retentively clinched between the first arm 304' and the second arm 304", thereby retaining the fixture 308 to the mounting structure 192, and in turn the sensor unit 164' to the end 344 of the post 176'. In some cases, one or more of the first arm 304' or the second arm 304' and/or the stem plate 324 may include knurling, or the like, that may provide grip to assist with the clinching action yielded by the pair of arms 304, in turn enhancing a retention capacity of the pair of arms 304 to retain the stem plate 324, and thus the sensor unit 164' to the mounting structure 192".

With regard to the breakaway coupler 188'" illustrated in FIG. 4, the breakaway coupler 188'" includes the mounting structure 192'" and the retainer unit 196'". The mounting structure 192'" includes a first member 400 defining a receptacle 404 and a connector bolt 408 that is applied to connect the first member 400 to the end 180. For example, the first member 400 includes a crown 410, and the connector bolt 408 may be passed through the crown 410 and further into a portion of the end 180 so as to couple the first member 400 to the end 180. Optionally or additionally, adhesives, such as industrial grade adhesives, may be applied between the crown 410 and the end 180 to couple the first member 400 to the end 180.

The receptacle 404 is open to an outer surface 412 of the first member 400 at a first opening 416 and extends internally to the first member 400 all the way up to the crown 410. More particularly, the receptacle 404 defines an ingress portion 420 that extends from the first opening 416 inwards into the receptacle 404 and terminates at an ingress end 424, with a second opening 428 being defined at the ingress end 424. As illustrated in FIG. 4, the ingress portion 420 converges inwards from the first opening 416 to the second opening 428 such that a cross-sectional area defined at the first opening 416 is larger than a cross-sectional area defined at the second opening 428.

Beyond the second opening 428 or the ingress end 424 of the ingress portion 420, further into the receptacle 404, the receptacle 404 defines an inner pit 432, as shown. In other words, a portion of the receptacle 404 defined between the ingress end 424 and the crown 410 is defined as an inner pit 432 of the receptacle 404. The ingress portion 420 may be conical in profile, although other profiles of the ingress portion 420, such as a frustrum-shaped profile of the ingress portion 420, may be contemplated. In one or more embodiments, the first member 400 may be formed from an elastomeric material.

The retainer unit 196''' of the breakaway coupler 188''' includes a second member 436. The second member 436 defines a plug 440 that is received and retained within the receptacle 404. The plug 440 defines a first end 454 and a second end 458. The plug 440 may be coupled to the sensor unit 164' at the first end 454, while the second end 458 may be disposed away from the sensor unit 164', as shown. The plug 440 defines a stump portion 444 and an enlarged head portion 448 connected to the stump portion 444. As shown, the stump portion 444 extends from the first end 454 up to the enlarged head portion 448, while the enlarged head portion 448 extends from the stump portion 444 up to the second end 458. Effectively, an interface 462 is defined between the stump portion 444 and the enlarged head portion 448.

Although not limited, both the stump portion 444 and the enlarged head portion 448 may be annularly defined, allowing for both the stump portion 444 and the enlarged head portion 448 to be defined around a common axis 466. Further, the enlarged head portion 448 may include a tapering profile such that a relatively larger cross-sectional area of the enlarged head portion 448 is defined at the interface 462, while a relatively smaller cross-sectional area of the enlarged head portion 448 is defined at the second end 458. In assembly of the second member 436 to the first member 400, the enlarged head portion 448 is received within the inner pit 432 of the receptacle 404 and is retained therein by being seated against the ingress end 424 of the ingress portion 420, thus retaining the sensor unit 164' to the end 180. As with the first member 400, the second member 436 may be made from an elastomeric material, as well.

In one or more embodiments, a through-slot 470 is defined through the plug 440 (i.e., the through-slot 470 passes along the common axis 466 through both the stump portion 444 and the enlarged head portion 448 from the first end 454 to the second end 458). The through-slot 470 defines a step 474. For example, the step 474 is defined at about midway between the first end 454 and the second end 458, as shown. In this regard, an expanse of the through-slot 470 from the first end 454 to the step 474 is defined as a first slot portion 478, while an expanse of the through-slot 470 from the step 474 all the way up to the second end 458 is defined as a second slot portion 482. The first slot portion 478 may possess a smaller cross-sectional area as compared to a cross-sectional area of the second slot portion 482, thus defining the step 474 at an interface where the first slot portion 478 meets the second slot portion 482.

In one or more embodiments of the present disclosure, the retainer unit 196''' includes a plug fastener 486. The plug fastener 486 includes a head section 490 and a shank section 494, and is received within the through-slot 470. According to the disclosed embodiments, the plug fastener 486 is received into the through-slot 470 such that the head section 490 of the plug fastener 486 rests against the step 474, while the shank section 494 passes through the first slot portion 478 of the through-slot 470 and further into a portion 194 of the sensor unit 164' such that the plug fastener 486 may couple the plug 440 to the sensor unit 164''.

INDUSTRIAL APPLICABILITY

The forthcoming disclosure sets out an exemplary method to retain the sensor unit 164' to the paving machine 108. The method shall be discussed in conjunction with FIG. 1 and shall be applicable to each of the embodiments of the breakaway couplers 188 disclosed in the FIGS. 2, 3, and 4.

With regard to the method, as part of step one, an operator may couple the elongated structure 156 outwardly to a side portion (e.g., to the left side portion 168) of the paving machine 108 such that the elongated structure 156 extends along the direction of movement of the machine (e.g., direction, T). The manner of a coupling the elongated structure 156 to the left side portion 168 (i.e., either to the machine frame 136 or to the tow arm 152 disposed on the left side portion 168) of the paving machine 108 may be contemplated by someone of skill in the art. Once the elongated structure 156 is coupled, the operator may provide the breakaway coupler 188 to normally retain the sensor unit 164' to the end 180 of the post 176' of the elongated structure 156. Such assembly is performed for each of the sensor units 164 vis-à-vis the corresponding posts 176, and, in so doing, the sensor units 164 are arranged sequentially along the elongated structure 156.

Providing the breakaway coupler 188 to retain the sensor unit 164' to the post 176' includes securing the mounting structure 192 to the end 180 of the post 176' and providing the retainer unit 196 to retain the sensor unit 164' to the mounting structure 192 by a retention force. Further, an operator may adjust the retention force. In so doing, the retention force may be varied (e.g., lowered than a threshold) so as to cause a disengagement of the mounting structure 192 with respect to the sensor unit 164' and allow the sensor unit 164' to be dislodged from the end 180 to inhibit damage to the sensor unit 164', in an event the sensor unit 164' collides against an obstacle. Obstacles may include side curbs, bushes, trees, other machines, and/or may even represent personnel, etc., who may inadvertently get in the way of the sensor unit 164'.

With reference to FIG. 2, to retain the sensor unit 164' to the end 180 by way of the breakaway coupler 188', the operator may arrange and secure the shims 220 serially within the cavity 212 of the bracket 200 to define the innermost shim 220' and the outermost shim 220'' with respect to the cavity 212. In this regard, the operator may first insert and drive the shim retainers 216 (or bolts 224) through the base wall 204 such that the shank segments 232 of the bolts 224 may extend into the cavity 212. Then, the operator may insert the shims 220 into the cavity 212 by causing the shank segments 232 to pass through the slots 222 of the shims 220, thereby sliding each of the shims 220 over the shank segments 232. Once the last shim (i.e., the outermost shim 220'') is inserted and placed, the operator may turn the nuts 236 over the shank segments 232 to secure and retain the shims 220 within the cavity 212 as a single assembly.

The operator may then secure the bracket 200 to the end 180. For example, the operator may apply an adhesive on the base wall 204 and may cause the base wall 204 to adhere against the end 180. Additionally, or optionally, the bracket 200 may be secured by using one or more conventional fasteners, such as bolts, screws, rivets, and the like, as well. Thereafter, the operator may couple the magnetic adaptor 240 to the outermost shim 220''. A coupling between the magnetic adaptor 240 and the outermost shim 220" may be attained by applying an adhesive between the magnetic adaptor 240 and the outermost shim 220". Other methods of fastening the magnetic adaptor 240 to the outermost shim 220" may be contemplated, as discussed above.

The following may be noted—higher the number of shims 220, higher may be the retention force (i.e., magnetic force) offered by the retainer unit 196', and, conversely, lesser the number of shims 220, lesser may be the retention force (i.e., magnetic force) offered by the retainer unit 196'. Further, the operator may also position the magnetic adaptor 240 at least partially or wholly within the cavity 212 such that a variation of the magnetic adaptor 240 within the cavity 212 may cause the retention force to vary. For example, deeper the magnetic adaptor 240 is positioned within the cavity 212, lesser may be the magnetic force available to retain the sensor unit 164', while higher the magnetic adaptor 240 is positioned (i.e., closer to the exit of the cavity 212) higher may be the magnetic force available to retain the sensor unit 164'.

Once the magnetic adaptor 240 is positioned within the cavity 212, the operator may bring forth the sensor unit 164' towards the magnetic adaptor 240 such that the magnetic adaptor 240 attracts and retains the sensor unit 164' to the bracket 200 by magnetic force. Notably, adjusting the retention force of the retainer unit 196' includes at least one of varying a number of the shims 220, or replacing the magnetic adaptor 240 with a different magnetic adaptor possessing a different magnetic force.

With reference to FIG. 3, to retain the sensor unit 164' to the end 180 by way of the breakaway coupler 188", the operator may secure (e.g., by adhesive) the base plate 300 to the end 180, thus coupling the pair of arms 304 to the end 180. Thereafter, the operator may slidably pass the shank portion 332 of the fastener 312 through the aperture 336 of the first arm 304', draw the end 344 of the shank portion 332 into the opening 340 of the second arm 304", and further move the end 344 through the opening 340 such that the end 344 extends out from the opening 340 beyond the second arm 304". The operator may then fasten the end 344 of the shank portion 332 to the second arm 304" by securing the nut 348 to the end 344. Further, during such assembly, the operator may also position the biasing member 316 in between the head portion 328 of the fastener 312 and the first arm 304' such that a biasing force may be exerted between the head portion 328 and the first arm 304', causing the first arm 304' to bias away from the head portion 328 towards the second arm 304".

If the biasing member 316 includes the spring 352, during an assembly of the retainer unit 196", an operator may be required to position the spring 352 in line with the aperture 336 and the opening 340. For example, an arrangement of the spring 352 and the pair of arms 304', 304" during assembly may be in the following order: spring 352—aperture 336—opening 340, from the right to the left when viewing FIG. 3, such that the end 344 of the shank portion 332 may be passed through the spring 352 first, and, thereafter, the end 344 may be sequentially passed through the aperture 336 and then through the opening 340. Once the end 344 reaches the opening 340, the fastener 312 may need to be turned to threadably engage with the opening 340 or with the nut 348 (positionable with the help of a wrench tool or a spanner) to facilitate further passage of the end 344 beyond the opening 340 of the second arm 304". The nut 348 may be then coupled to the end 344 of the shank portion 332 so as to retentively fasten the shank portion 332, and thus the fastener 312 to the pair of arms 304', 304", as discussed above.

Next, the operator brings forth the stem plate 324 of the fixture 308 into a gap defined between the first arm 304' and the second arm 304"—because a gap may be non-existent owing to the biasing force offered by the biasing member 316 and/or the spring tension, external force may be required to move the first arm 304' away from the second arm 304" to define and enlarge the gap. With the biasing member 316 exerting the biasing force on the first arm 304' to move towards the second arm 304" (and optionally with the spring tension acting to bias the first arm 304' to the second arm 304") a positioning of the stem plate 324 of the fixture 308 between the first arm 304' and the second arm 304" is such that the stem plate 324 is clinched between the first arm 304' and the second arm 304". Effectively, the pair of arms 304 retain the sensor unit 164' to the elongated structure 156 (i.e., to the end 180 of the post 176' of the elongated structure 156) by way of a clinching force that is developed between the first arm 304' and the second arm 304" and enacted and furthered by the biasing force offered by the biasing member 316 acting to bias the first arm 304' towards the second arm 304".

Notably, adjusting the retention force of the retainer unit 196" includes at least one of replacing the biasing member 316 with a different biasing member adapted to exert a different biasing force between the head portion 328 and the first arm 304', or tightening or loosening the fastener 312 relative to the second arm 304" to cause the biasing member 316 to proportionally exert an increased biasing force or a decreased biasing force on the first arm 304'.

With reference to FIG. 4, to retain the sensor unit 164' to the end 180 by way of the breakaway coupler 188''', the operator may secure the first member 400 to the end 180. For example, the operator may insert and drive the connector bolt 408 through the crown 410 and the end 180, thereby threadably engaging the crown 410 to the end 180, and in turn coupling the first member 400 to the end 180. Additionally, or optionally, an adhesive may be used to couple and secure the first member 400 to the end 180. Thereafter, the operator may couple the second member 436 to the sensor unit 164'. For example, the operator may insert and drive the plug fastener 486 through the through-slot 470, draw the shank section 494 out through the first end 454 of the plug 440, engage the shank section 494 with the portion 194 of the sensor unit 164', and turn the plug fastener 486 to threadably engage the plug fastener 486 with the portion 194 until the head section 490 reaches up to the step 474 and rests atop the step 474. Additionally, or optionally, adhesives may be applied to couple the plug 440 to the portion 194 of the sensor unit 164'.

Once the plug 440 is fastened, the operator may bring forth the enlarged head portion of the plug 440 and may insert the enlarged head portion of the plug 440 into the receptacle 404. It may be noted that during a receipt of the plug 440 into the receptacle 404, the enlarged head portion 448 may slide against the ingress portion 420, enter and snap into the inner pit 432 of the receptacle 404 through the second opening 428 of the ingress portion 420, and be retained therein by being seated against the ingress end 424 of the ingress portion 420.

Notably, adjusting the retention force of the retainer unit 196''' includes at least one of replacing the first member 400 with a different first member possessing a different elastomeric property when compared to an elastomeric property of the first member 400, or replacing the second member 436 with a different second member possessing a different elastomeric property when compared to an elastomeric property of the second member 436. In some embodiments, the plug fastener 486 may be tightened to mushroom out the enlarged head portion 448, thus enabling the second member 436 to be retained with the first member 400 with an increased retention force.

It may be noted that the above mentioned embodiments of the breakaway couplers 188', 188", 188''' may be used either exclusively or in combination with each other on the paving machine 108, and/or their usage may depend upon user discretion, requirement, and/or part availability. With the adjustable functionality of the breakaway couplers 188', 188", 188''' being offered as discussed above, an operator is at liberty to set the retention force to a level as deemed to be sufficient to normally retain the sensor unit 164' with respect to any of the mounting structures 192', 192", 192''', such that in the event the sensor unit 164' were to collide against an obstacle, the sensor unit 164' may be effectively dislodged from the elongated structure 156 (or from the end 180 of the post 176' of the elongated structure 156). Such adjustment functionality afforded by the breakaway couplers 188', 188", 188''' inhibits damage to the sensor unit 164', thus prolonging the life of the sensor unit 164', reducing machine downtime, easing overall machine operations, and enhancing productivity. In some embodiments, a flexible string (not shown) may be coupled between the post 176' and the sensor unit 164' such that if a dislodgement were to occur, the flexible string would the keep the sensor unit 164' hanging under the post 176', preventing the sensor unit 164' from dropping to the surface 104.

Further, it may be noted that a coupling of the sensor unit 164' to the end 180, with the help of the breakaway couplers 188', 188", 188''', is relatively easy, requiring less effort and time, as the coupling process or the method is free from the use of complex fasteners, fittings, and tools, to either secure or loosen the sensor unit 164' with respect to the end 180, mostly allowing for a tool free sensor unit installation and uninstallation. This allows operators to easily affix the sensor units 164' to the elongated structure (e.g., at the start of a work cycle) and remove the sensor unit 164' (e.g., at an end of the work cycle), and stack and store the sensor unit 164' away safely when not in use. Moreover, the breakaway couplers 188', 188", 188''' are retrofittable to several configurations of the sensor unit 164' and the end 180, making it possible to apply the breakaway couplers 188', 188", 188''' to a wide variety of machines and structures.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A paving machine, comprising:
   an implement to modify a surface during a movement of the paving machine;
   an elongated structure coupled outwardly to a side portion of the paving machine and extending along a direction of the movement;
   a sensor arrangement including one or more sensor units arranged sequentially along the elongated structure; and
   one or more breakaway couplers to correspondingly normally retain the one or more sensor units to the elongated structure, each breakaway coupler of the one or more breakaway couplers including:
   a mounting structure secured to one of the elongated structure or a corresponding sensor unit of the one or more sensor units; and
   a retainer unit retaining the other of the elongated structure or the corresponding sensor unit to the mounting structure by a retention force, wherein the retention force is adjustable to cause the mounting structure to be disengaged with respect to one of the elongated structure or the corresponding sensor unit and allow the corresponding sensor unit to be dislodged from the elongated structure to inhibit damage to the corresponding sensor unit, in an event the corresponding sensor unit collides against an obstacle.

2. The paving machine of claim 1, wherein
   the mounting structure includes a bracket defining a cavity; and
   the retainer unit includes:
   one or more shims serially arranged and secured within the cavity to define an innermost shim and an outermost shim with respect to the cavity; and
   a magnetic adaptor coupled to the outermost shim and attracting and retaining one of the elongated structure or the corresponding sensor unit by magnetic force.

3. The paving machine of claim 2, wherein the magnetic adaptor is positioned wholly or at least partially within the cavity.

4. The paving machine of claim 2, wherein the retention force includes the magnetic force and said retention force is adjustable by at least one of:
   varying a number of shims of the one or more shims; or
   replacing the magnetic adaptor with a different magnetic adaptor possessing a different magnetic force.

5. The paving machine of claim 1, wherein
   the mounting structure includes a pair of arms defining a first arm and a second arm; and
   the retainer unit includes:
   a fixture coupled to one of the elongated structure or the corresponding sensor unit and be received between the first arm and the second arm;
   a fastener including a head portion and a shank portion, the shank portion being in slidable passage through the first arm and being retentively retained to the second arm; and
   a biasing member positioned in between the head portion and the first arm and exerting a biasing force therebetween to bias the first arm away from the head portion towards the second arm to cause the fixture to be clinched between the first arm and the second arm.

6. The paving machine of claim 5, wherein the retention force includes the biasing force, and the retention force is adjustable by at least one of:
   replacing the biasing member with a different biasing member adapted to exert a different biasing force between the head portion and the first arm; or
   tightening or loosening the fastener relative to the second arm to cause the biasing member to proportionally exert an increased biasing force or a decreased biasing force on the first arm.

7. The paving machine of claim 1, wherein
   the mounting structure includes a first member defining a receptacle; and the retainer unit includes a second member defining a plug received and retained within the receptacle, wherein at least one of the first member or the second member is made from an elastomeric material.

8. The paving machine of claim 7, wherein the receptacle is open to an outer surface of the first member at a first opening, the receptacle defining an ingress portion that extends inwards into the receptacle from the first opening and terminates at an end defining a second opening, wherein the ingress portion converges inwards into the receptacle from the first opening to the second opening such that a cross-sectional area defined at the first opening is larger than a cross-sectional area defined at the second opening.

9. The paving machine of claim 8, wherein the plug defines a stump portion and an enlarged head portion connected to the stump portion, and wherein the stump portion is received within an inner pit of the receptacle defined beyond the end of the ingress portion and is retained therein by being seated against the end of the ingress portion.

10. The paving machine of claim 9, wherein the retention force is adjustable by at least one of:
replacing the first member with a different first member possessing a different elastomeric property when compared to an elastomeric property of the first member; or
replacing the second member with a different second member possessing a different elastomeric property when compared to an elastomeric property of the second member.

11. A method for retaining one or more sensor units to a paving machine, the method comprising:
coupling an elongated structure outwardly to a side portion of the paving machine such that the elongated structure extends along a direction of movement of the paving machine; and
providing one or more breakaway couplers to correspondingly normally retain the one or more sensor units to the elongated structure such that the one or more sensor units are arranged sequentially along the elongated structure, wherein providing each break-away coupler of the one or more breakaway couplers include:
securing a mounting structure to one of the elongated structure or a corresponding sensor unit of the one or more sensor units;
providing a retainer unit to retain the other of the elongated structure or the corresponding sensor unit to the mounting structure by a retention force; and
adjusting the retention force to cause a disengagement of the mounting structure with respect to one of the elongated structure or the corresponding sensor unit and allow the corresponding sensor unit to be dislodged from the elongated structure to inhibit damage to the corresponding sensor unit, in an event the corresponding sensor unit collides against an obstacle.

12. The method of claim 11, wherein:
securing the mounting structure includes securing a bracket to one of the elongated structure or the corresponding sensor unit, the bracket defining a cavity, and
providing the retainer unit includes:
arranging and securing one or more shims serially within the cavity to define an innermost shim and an outermost shim with respect to the cavity; and
coupling a magnetic adaptor to the outermost shim to attract and retain one of the elongated structure or the corresponding sensor unit by magnetic force.

13. The method of claim 12, wherein coupling the magnetic adaptor includes positioning the magnetic adaptor wholly or at least partially within the cavity.

14. The method of claim 12, wherein the retention force includes the magnetic force, and adjusting the retention force includes at least one of:
varying a number of shims of the one or more shims; or
replacing the magnetic adaptor with a different magnetic adaptor possessing a different magnetic force.

15. The method of claim 11, wherein
securing the mounting structure includes securing a pair of arms to one of the elongated structure or the corresponding sensor unit, the pair of arms defining a first arm and a second arm; and
providing the retainer unit includes:
coupling a fixture to one of the elongated structure or the corresponding sensor unit and be received between the first arm and the second arm;
slidably passing a shank portion of a fastener through the first arm;
retentively fastening the shank portion to the second arm; and
positioning a biasing member in between a head portion of the fastener and the first arm to exert a biasing force and bias the first arm away from the head portion towards the second arm to cause the fixture to be clinched between the first arm and the second arm.

16. The method of claim 15, wherein the retention force includes the biasing force, and adjusting the retention force includes at least one of:
replacing the biasing member with a different biasing member adapted to exert a different biasing force between the head portion and the first arm; or
tightening or loosening the fastener relative to the second arm to cause the biasing member to proportionally exert an increased biasing force or a decreased biasing force on the first arm.

17. The method of claim 15, wherein
securing the mounting structure includes securing a first member to one of the elongated structure or the corresponding sensor unit, the first member defining a receptacle, and
providing the retainer unit includes:
coupling a second member to one of the elongated structure or the corresponding sensor unit, the second member defining a plug; and
inserting and retaining the plug within the receptacle, wherein at least one of the first member or the second member is made from an elastomeric material.

18. The method of claim 17, wherein the receptacle is open to an outer surface of the first member at a first opening, the receptacle defining an ingress portion that extends inwards into the receptacle from the first opening and terminates at an end defining a second opening, wherein the ingress portion converges inwards into the receptacle from the first opening to the second opening such that a cross-sectional area defined at the first opening is larger than a cross-sectional area defined at the second opening.

19. The method of claim 18, wherein
the plug defines a stump portion and an enlarged head portion connected to the stump portion, and
during a receipt of the plug into the receptacle, the enlarged head portion slides against the ingress portion, enters and snaps into an inner pit of the receptacle through the second opening of the ingress portion, and is retained therein by being seated against the end of the ingress portion.

20. The method of claim 17, wherein adjusting the retention force includes at least one of:
   replacing the first member with a different first member possessing a different elastomeric property when compared to an elastomeric property of the first member; or
   replacing the second member with a different second member possessing a different elastomeric property when compared to an elastomeric property of the second member.

\* \* \* \* \*